March 8, 1960 R. C. WILSON 2,927,397
KNOCK DOWN ANIMAL TOY
Filed March 16, 1959 2 Sheets-Sheet 1
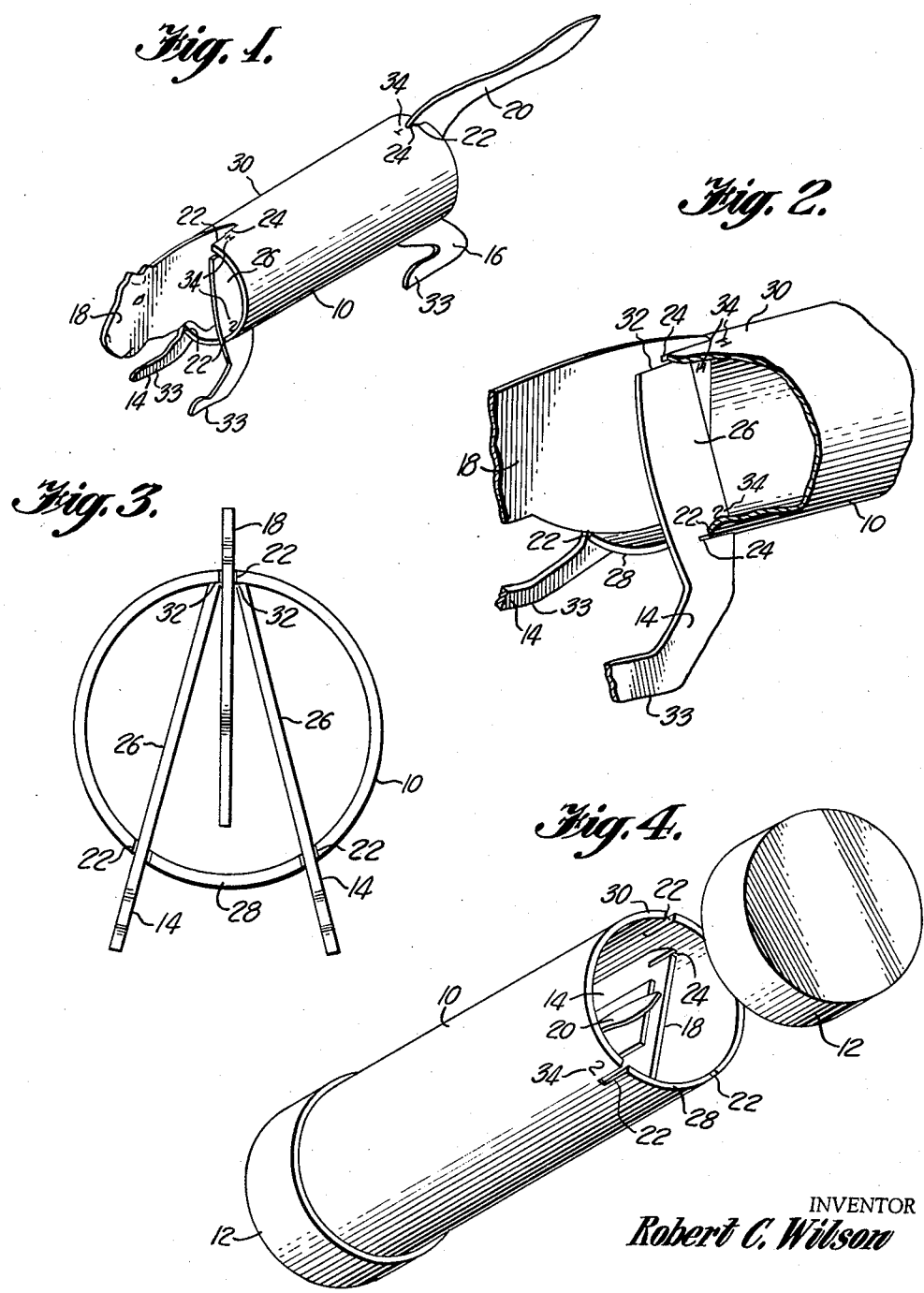
INVENTOR
Robert C. Wilson
BY Samuel Stearman
ATTORNEY March 8, 1960    R. C. WILSON    2,927,397
KNOCK DOWN ANIMAL TOY
Filed March 16, 1959    2 Sheets-Sheet 2
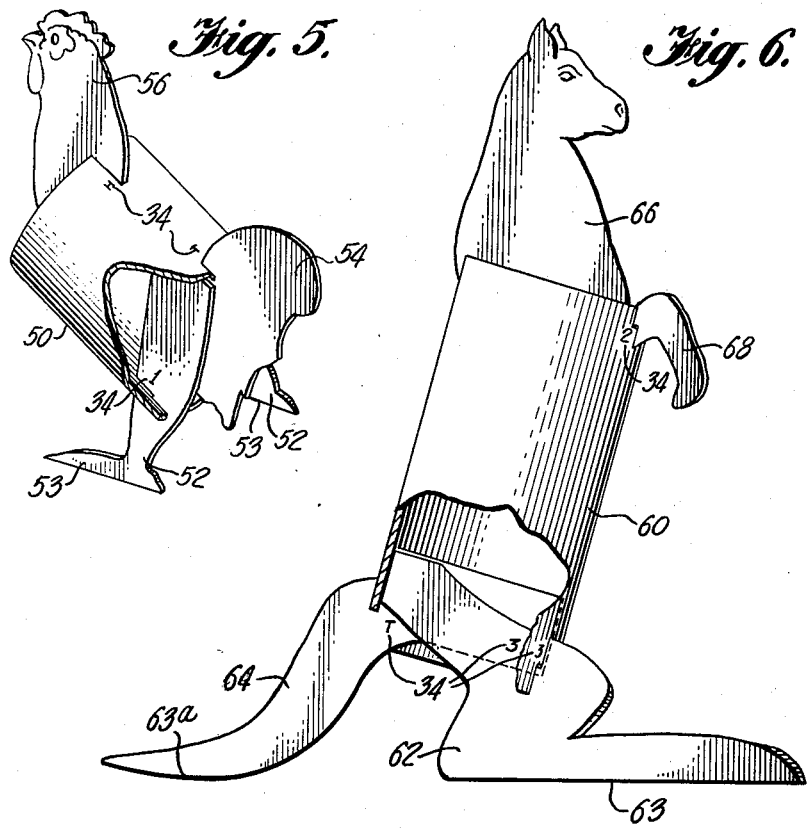
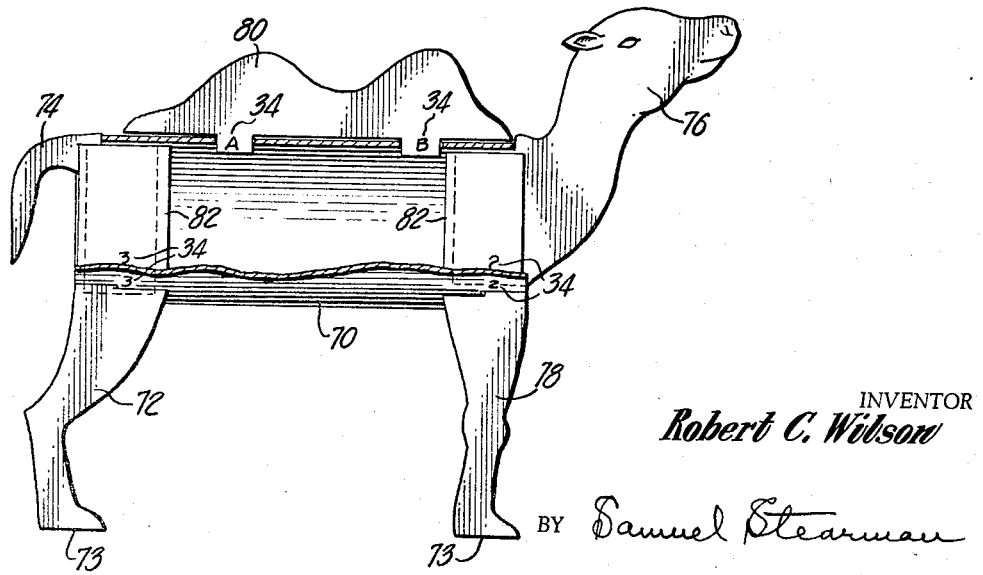
INVENTOR
Robert C. Wilson
BY Samuel Stearman
ATTORNEY

United States Patent Office 2,927,397
Patented Mar. 8, 1960

2,927,397

KNOCK DOWN ANIMAL TOY

Robert C. Wilson, Chula Vista, Calif.

Application March 16, 1959, Serial No. 799,748

9 Claims. (Cl. 46—22)

This invention relates generally to toys, more particularly to simulated animal toys of knock down character.

This application is a continuation-in-part of my previous application, Ser. No. 575,266, filed March 30, 1956, now abandoned.

The primary object of the invention is to provide a toy having educational as well as entertainment value.

Another object of the invention is to provide a toy which serves to teach a child playing therewith the approximate conformations of various animals.

Another object of the invention is to provide a toy of this character which will have further utility in helping to develop the finger dexterity of a child, by means of a construction in which the proper assembly of the various parts in simulation of an animal will require reasonably careful placement of the parts, without, however, being so difficult as to prevent the toy from being highly interesting to children of even quite a young age.

Still another object of the invention is to provide a toy of this character which is reasonably durable and which can be mass produced at very low cost, these two features being obviously desirable, if not necessary, in toys for young children. Another object of the invention is to provide a toy which is extremely versatile in use, can be used by children of widely varying ages, and at the same time can be adapted to the production of simulated animals for decorative and display uses.

Briefly, in accordance with the invention, the top is constituted of a hollow, preferably tubular member, open at each end and serving as the body portion of the simulated animal, together with a plurality of flat members suitably configured for simulating the appendages, namely, the head, legs, tail, etc., of the animal, and removably engageable with one or the other ends of the body member. Each of the appendage-simulating members has a portion thereof which extends interiorly of the body and which is provided with an edge located so as to be in frictional contact with the inner surface of the body when properly engaged therewith. The appendage members, at least in those portions which will be exposed to view when they are engaged with the body, are configured and surface decorated to simulate the shape and colorings of the appendages of the animal. The exterior surface of the body member is correspondingly surface decorated. Appendage members engageable with at least one of the ends of the body are provided with terminal edges located so as to extend substantially in a common plane with one another when these appendage members are engaged with the body, so that the assembled simulated animal toy may be supported on a flat surface. Thus, the invention may be utilized in embodiments which simulate two-legged as well as four-legged animals, and also to simulate animals as they appear in various positions, e.g., a bear resting on its hind legs.

The interengagement of the appendage members with the body member at the open ends thereof is arranged at fixed or predetermined places along said edges, so that in assembled position, the appendage members simulating the head and the tail are disposed in a plane which extends through the axis or longitudinal center of the body, and those simulating legs or paws are disposed in angularly symmetrical relation with respect to the axially disposed appendage-simulating members. Preferably, the dimensions and the angular disposition of the last-named appendage members are such that their inner terminal edges are not only in frictional contact, as above stated, with the inner surface of the hollow body member, but also lie in surface contact with the axially disposed appendage member engaged with the adjoining end of the body, so that these members mutually brace one another in their positions of engagement with the body.

Desirably, each of the appendage members may have suitable indicia, such as different letters or numerals imprinted thereon, to correspond to similar indicia imprinted on the body member to enable a child to determine the proper location for each of the respective appendage members to be engaged with a body member in assembling the particular animal to be simulated.

It is an important feature of the invention, also, that the several members may each be dimensioned so that while reasonably proportional to the corresponding parts of the animal to be simulated, the body-simulating member may also be utilized as a container for the appendage-simulating members, thereby also training the child, in a very practical way, to be neat in its habits, since the child is encouraged by the nature and construction of the toy, when disassembling the same after playing therewith, to pack the various appendage-members inside the hollow body for storage.

In the preferred embodiment of the invention, the engagement of the appendage members with the open ends of the body is effected by means of co-operating slots formed at appropriate positions on certain of the edges of the respective members and extending inwardly therefrom. The slots, accordingly, are of a width substantially equal to the cross-sectional thickness of the material of which the body and the appendage members are composed.

The foregoing and other objects and advantages of the invention will be more clearly apparent from the following description and the accompanying drawings, in which:

Figure 1 is a view, in perspective, of a simulated animal, constructed and assembled from its several parts, according to the invention.

Figure 2 is an enlarged, fragmentary view of the front end portion of the simulated animal shown in Figure 1;

Figure 3 is a front elevational view of the structure shown in Figure 1;

Figure 4 is a view, in perspective, of the toy in knock down condition, with the appendages stored in the body member, and with one end cap of the hollow body shown removed therefrom to illustrate the relative positions assumed by the appendages;

Figure 5 is a view, in perspective, partly broken away, of another simulated animal embodying the invention;

Figure 6 if a similar view of still another simulated animal embodying the invention; and Figure 7 is a view, partly in elevation and partly in cross-section, of still another embodiment.

Referring more in detail to the drawings, and particularly to Figures 1–4 thereof, the body-simulating member is indicated at 10. As illustrated, this preferably is in the form of a hollow tube or cylinder of a length and diameter in suitable proportion to the dimensions of the appendage members for simulating the animal, and such as to be capable of enclosing the appendages for storage purposes, the appendages being retained therein by closure caps 12, as more particularly shown in Figure 4.

All the parts of the toy may be readily constructed from cardboard. The surfaces of the body and at least of those surfaces of the appendages which are exposed to view when assembled in animal-simulating position, may be imprinted or otherwise decorated in colors and other demarkations like those of the animal to be simulated.

Alternatively, the parts may be made from other materials, such as synthetic resin plastic, and the surface appearance of the animal to be simulated may be imparted by suitably coloring and/or embossing the surfaces thereof. If desired, the toy may also be constructed from wood or metal.

In the embodiment illustrated in Figures 1–4, the appendage members comprise front legs 14, hind legs 16, a head 18 and a tail 20. These are all preferably made from flat stock.

Relatively narrow, elongated slots 22 extend inwardly from the edges of each of the open ends of the hollow body 10, at suitable locations along said edges to receive intermediate portions of the appendages 14, 16, 18 and 20. A cooperating slot, indicated at 24, is provided at a suitable location along an edge of each of the appendages 14, 16, 18 and 20, for interfitting engagement with the slots 22. As above indicated, the appendages are of rectangular cross-sectional shape. The width of the slots 22 and 24 will be substantially equal to the cross-sectional thickness of the material of which the appendage members and the body are respectively composed.

The portion, indicated at 26, of certain of the appendages extends into the interior of the hollow body, when the slots 24 of these appendages are interengaged with the slots 22 formed in the lower section 28 of the body. These appendages are disposed as chords or secants of the circular body, and their inner terminal edges 32 will be disposed, in the assembled toy, in frictional contact with the inner peripheral surface of the body along the upper section 30 thereof. This frictional contact of the edge portions 32 with the inner surface of the body 10, serves, in conjunction with the interengaged slots 22, 24 to restrain movement of these appendage members to an undesirable degree. As will be observed, the appendages 14, 16 are disposed in angularly symmetrical relation with respect to the appendages 18, 20, which latter are disposed in a vertical plane extending through the axis of the body member 10.

The terminal edges 32 of the appendages 14, 16 are of considerable length, say, one-half inch or more, so as to be in contact with a substantial length of the inner surface of the body member 10.

Preferably, the location of the slots 22 in the lower portion 28 of the body is such that the angular position of the appendages 14, as well as that of the appendages 16, will be such as to enable the inner terminal edges 32 of these appendages not only to be in frictional contact with the inner peripheral surface of the body, but also to engage the opposite faces of the respective appendages 18, 20, when the latter are engaged in the slots 22 formed in the upper section 30 of the hollow body. In this manner, the appendages 14, 18 at the head end of the simulated animal, as well as the appendages 16, 20 at the tail end thereof, serve to mutually brace one another in their position of engagement with the body. Thus, the appendage members may be held in stable position when in proper engagement with the body.

It is a further feature of the construction that the angularly disposed appendage-simulating members 14 and 16 have their outer terminal edges, as indicated at 33, disposed substantially in a common plane, so as to enable the assembled toy to be supported in normal position on a flat surface. As will be evident, where the simulated animal is one which possesses in actuality only two legs, or is one which is simulative of a four-legged animal resting on its hind legs, the two leg-simulating appendage members utilized will nevertheless support the assembled toy on a flat surface if the outer terminal edges thereof are disposed in a common plane (see, for example, the embodiments illustrated in Figures 5 and 6).

Desirably, as above indicated, suitable indicia, as indicated at 34, may be imprinted or impressed on a surface of each appendage member adjacent the slot 24 formed therein, and on the surface of the hollow body 10 adjacent the slots 22 therein, to indicate the proper slots 24 for the interengaging of the head-, tail-, and leg-simulating appendages with the appropriate slots 22 in the body portion.

Figure 5 of the drawings illustrates an embodiment of the invention wherein the assembled parts simulate a two-legged animal, such as a rooster. As illustrated, this may comprise a hollow body 50, legs 52, tail 54 and head 56. The leg appendages 52 and the appendage 54, as will be seen from the figure, co-act with the upper section of the hollow body 50, and with one another in the same manner previously described with reference to the appendages 16, 20 (or 14, 18) of the simulated animal illustrated in Figures 1–3. Likewise, the outer terminal edges 53 of the appendage members 52, are disposed in a common plane. As will be evident, here also the appendage members 52, 54 and 56 may be dimensioned and configured in relation to the dimensions of the body member 50 to enable the appendage members all to be enclosed within the body 50 so that the latter may serve as a container for the appendage members when the parts are disassembled and not in use.

Figure 6 of the drawings shows an embodiment of the invention wherein the assembled parts are formed so as to simulate an animal resting on its hind legs. The hollow body 60, simulating the body portion of the animal, may in this instance also be suitably dimensioned to serve as a container for the appendage members 62, 64, 66 and 68. Here the appendage members are configured to simulate the animal as it might appear when resting on its hind legs. As will be understood, the edges at each open end of the body simulating member 60 are provided with slots at suitable locations to cooperate with appropriately located slots formed in an edge of each of the appendage members. In this embodiment, the outer terminal edges 63 of the appendage members 62, and if desired, also the outer terminal edge 63a of appendage member 64 are disposed in a common plane, for the purpose above stated. As will be evident, the appendage members 62, 64 are arranged to be disposed in mutually bracing positions. Appendages 66, 68 may likewise be so arranged.

Figure 7 illustrates still another embodiment of the invention. In this embodiment, the appendage members 72 simulating the hind legs are disposed so as to co-act in the above-described manner, with the appendage member 74 simulating the tail of the animal. In similar manner, the appendage members 78, simulating the forelegs to co-act with appendage member 76 simulating the head of the animal. The appendage member 80, simulating the humped back of the animal can be made to co-act with the inwardly extending portions 82 of the leg appendages 72, 78, but this is not deemed necessary and is not represented in the drawing. The member 80 may, however, be detachably engaged with the body 70 as by means of spaced tabs A and B formed along the lower edge thereof and receivable in closed-end slots formed in the upper portion of the body. Here again, the outer terminal edges 73 of appendage members 72 and 78 are disposed in a common plane. The appendages, including the appendage 80, are dimensioned to be storable in the hollow body 70.

It will be obvious that the invention can be embodied in simulations of still other types of animals and the disclosed embodiments should be considered as merely representative and not limiting. Although the hollow body members have been illustrated and described as being circular in cross-section, they may, if desired, be of oval or like cross-section, or the upper portion thereof may be somewhat flattened. Furthermore, the form of the appendage members and of the interfitting elements, illustrated herein by slots 22 and 24, may also be modified, if desired.

Desirably, the toys embodying the invention may be merchandised in packages each containing the required parts for simulating a plurality of different animals, the appendage members for each of these being enclosed within the respective body members, and the latter being closed by end caps 12.

Alternatively, the merchandised package may be made up of a desired number of the body members and their closure caps 12, together with a corresponding number of suitably imprinted flat bases made of cardboard or the like, each scored, slit or perforated in outlines to provide the necessary appendage members for one of the body members when the appendage members are pulled away or otherwise separated from the board base. For lending even further interest to a child in playing with the simulated animals provided in the package there may also be included in the package cardboard or similar members and suitable accessory elements which can be set up by the child to construct a minature animal cage for housing one or more of the simulated animals.

I claim:

1. A knock down simulated animal toy consisting essentially of (1) an elongated hollow body open at each end thereof, and (2) a plurality of appendage members removably engageable with said body at one of said open ends thereof, each of said members comprising a portion formed to extend interiorly of the body and a portion formed to extend exteriorly of the body when said member is engaged with the body, said interiorly extending portion of certain of said appendage members each having an edge positioned to be in frictional contact with the inner peripheral surface of the body when said member is engaged with the body, said exteriorly extending portion of each member being formed to simulate an appendage of an animal, one of said exteriorly extending portions having an outer terminal edge disposed substantially in a common plane with an outer terminal edge of another of said exteriorly extending portions when said members are engaged with the body, one of the other edges of each of said appendage members being formed for interfitting engagement with said open end of the body at predetermined places along the edge thereof, one of said appendage members engaged with said open end being disposed along the axis of said body, the others of said members engaged at said end being disposed in angularly symmetrical relation with respect to the axially disposed member.

2. A knock down simulated animal toy as defined in claim 1, wherein the inner terminal edges of said angularly disposed members are in surface contact with said axially disposed member when said members are engaged with said body, whereby said members mutually brace one another in their positions of engagement with the body.

3. A knock down simulated animal toy as defined in claim 1, wherein the engagement of said members with said open end of the body is effected by interengaging slots formed in said members and at said predetermined places along the edge of one of said open ends of the body, said slots being of a width substantially equal to the cross-sectional thickness of the material of which said body and said members are composed.

4. A knock down simulated animal toy as defined in claim 1, wherein said body is dimensioned relative to the overall dimensions of said members to enable the body to serve as a container for all of said members when the latter are disengaged from the body.

5. A knock down simulated animal toy as defined in claim 1, having an appendage member engageable with the other of said open ends of the body in axially disposed relation to the body, and other appendage members engageable with said other open end of the body in angularly symmetrical relation with respect to the axially disposed member at said end.

6. A knock down simulated animal toy as defined in claim 2, wherein the engagement of said members with said open ends of the body is effected by interengaging slots formed in said members and at said predetermined places along the edge of each of said open ends of the body, said slots being of a width substantially equal to the cross-sectional thickness of the material of which said body and said members are composed.

7. A knock down simulated animal toy as defined in claim 5, wherein the engagement of said members with said open ends of the body is effected by interengaging slots formed in said members and at said predetermined places along the edge of each of said open ends of the body, said slots being of a width substantially equal to the cross-sectional thickness of the material of which said body and said members are composed.

8. A knock down simulated animal toy as defined in claim 5, wherein the inner terminal edges of said angularly disposed members at each of said ends are in surface contact with said corresponding axially disposed member at said end when said members are engaged with said body, whereby said members engaged with each end of the body mutually brace one another.

9. A knock down simulated animal toy as defined in claim 5, wherein said body is dimensioned relative to the overall dimensions of said members to enable the body to serve as a container for all of said members when the latter are disengaged from the body.

References Cited in the file of this patent

UNITED STATES PATENTS

| | | |
|---|---|---|
| 2,144,751 | Brown | Jan. 24, 1939 |
| 2,238,455 | Steinhilder | Apr. 15, 1941 |
| 2,560,657 | Nogle | July 17, 1951 |